US005096579A

United States Patent [19]

Jordan et al.

[11] Patent Number: 5,096,579

[45] Date of Patent: Mar. 17, 1992

[54] ANAEROBIC DIGESTER

[75] Inventors: Jeff P. Jordan; James D. McElvaney, both of Kailua, Hi.

[73] Assignee: Unisyn, Seattle, Wash.

[21] Appl. No.: 593,197

[22] Filed: Oct. 5, 1990

[51] Int. Cl.[5] ................ C02F 3/28

[52] U.S. Cl. ................ 210/194; 210/150; 210/615

[58] Field of Search ................ 210/150, 151, 194, 196, 210/615, 629, 242.1, 521

[56] References Cited

U.S. PATENT DOCUMENTS

| | | | |
|---|---|---|---|
| 1,286,775 | 12/1918 | Rein et al. | 210/194 |
| 2,653,907 | 9/1953 | Griffith | 210/194 |
| 3,078,999 | 2/1963 | Kelly | 210/194 |
| 3,371,033 | 2/1968 | Simmons et al. | 210/615 |
| 3,385,786 | 5/1968 | Klock | 210/12 |
| 3,444,647 | 5/1969 | Takahashi | 47/1.4 |
| 4,044,500 | 8/1977 | Hitzman | 47/1.4 |
| 4,209,388 | 6/1980 | DeFraites | 210/8 |
| 4,354,936 | 10/1982 | Ishida et al. | 210/602 |
| 4,415,450 | 11/1983 | Wolverton | 210/602 |
| 4,432,869 | 2/1984 | Groeneweg et al. | 210/602 |
| 4,454,035 | 6/1984 | Stefan | 210/242.1 |
| 4,596,658 | 6/1986 | Mandt | 210/629 |
| 4,895,645 | 1/1990 | Zorich, Jr. | 210/196 |

FOREIGN PATENT DOCUMENTS

| | | |
|---|---|---|
| 3327774 | 2/1985 | Fed. Rep. of Germany . |
| 55-119498 | 9/1980 | Japan . |
| 60-232290 | 11/1985 | Japan . |
| 252094 | 2/1990 | Japan . |

*Primary Examiner*—Stanley S. Silverman
*Assistant Examiner*—Christopher Upton
*Attorney, Agent, or Firm*—Christensen, O'Connor, Johnson & Kindness

[57] ABSTRACT

An anaerobic digester for digesting animal manure and other biologically degradable material contains support media for enhancing the contact between the microbes in the digesting mass and the available nutrients. The digester includes a novel fluid circulation and distribution system. The distribution system prevents build up of heavy material in the bottom of the digester and prevents agglomeration of light material at the top of the digester. The digesting fluid travels over a floating weir into an intake and impeller assembly. The impeller drives the fluid through a conduit located adjacent the floor of the digester. Nozzles in the conduit project the fluid downwardly toward the floor thus causing a sweeping action on the floor. Fluid then flows upwardly past the support media. Risers are provided at the ends of the conduit, which terminate in nozzles at the surface of the digesting liquid. The nozzles direct the flow of digesting material back toward the fluid inlet and also sweep the corners of the digester to prevent material accumulation.

11 Claims, 6 Drawing Sheets

ANAEROBIC DIGESTER

BACKGROUND OF THE INVENTION

The present invention relates to a system for anaerobically digesting manure and other materials, and more particularly to a digester for use in an anaerobic digesting system.

Animal manures and other organic materials are digested anaerobically, that is, in the absence of oxygen, to detoxify the materials to make them safe for disposal or secondary use. By-products of the anaerobic digestion system are methane and single cell protein.

Organic feed stock, such as manure, is introduced into digesters in the form of thick aqueous slurries. If allowed to stagnate in the digester, the slurry separates into a heavy phase, a liquid phase and a light phase. The heavy phase settles out and cemented by the action of anaerobic bacteria into a monolithic block on the bottom of the digester. The light phase rises to the top of the liquid phase. The light phase is usually high in fiber so that the anaerobic bacteria glues into a composite mat of considerable strength, forming a film over the top of the liquid phase. Once the heavy and light phases have been allowed to form and solidify, it is difficult to break up the build up in the digester and to remove the heavy and light phases.

Mechanical agitators have been employed to maintain movement of the heavy phase. The mechanical agitators are subject to corrosion and breakage because of the severe environmental conditions at the bottom of the digester. Accordingly, mechanical agitation is not the final answer. Regarding the light phase, no satisfactory solution has been suggested for prevention of formation of the fibrous mat.

SUMMARY OF THE INVENTION

The present invention provides a digester and a specialized mixing system within the digester that eliminates the build up of heavy and light phases in the digesting mass. The digester constructed in accordance with the present invention includes a container having first and second ends and microbe support media positioned in the container for supporting microorganisms. A means for circulating liquid in the container has an inlet adjacent the first end and in the upper portion of said container and a distribution conduit extending from the inlet toward the bottom of the container adjacent the first end. The distribution conduit further extends along the bottom of the container from adjacent the first end to adjacent the second end. A pump means draws liquid into the inlet and circulates the liquid through the conduit. A plurality of nozzle means are coupled to the distribution conduit at spaced locations along the bottom of the container. The nozzles are oriented to spray liquid from the conduit downwardly toward the bottom of the container. The liquid from the nozzles first flows downwardly then outwardly along the floor of the container and thereafter upwardly past the support media and along the side walls of the container.

In a preferred form of the invention, a secondary distribution conduit is coupled to the primary distribution conduit adjacent the second end and extends upwardly to the upper portion of the container. A horizontal nozzle is coupled to the upper end of the secondary distribution conduit for directing liquid back toward the inlet adjacent the first end.

The support media preferably comprises a plurality of panels arranged in the container. The panels are, preferably arranged, generally parallel to the side walls of the container and in an upright plane so that digesting liquid can flow upwardly between the panels.

In operation, the digester constructed in accordance with the present invention will maintain sufficient flow along the digester floor to prevent build up of a heavy phase. Moreover, the surface skimming nozzles in conjunction with the circulation system continuously works the fluid at the top.

BRIEF DESCRIPTION OF THE DRAWINGS

A better understanding of the present invention can be derived by reading the ensuing specification in conjunction with the accompanying drawings wherein.

DETAILED DESCRIPTION OF THE INVENTION

Figure 1:
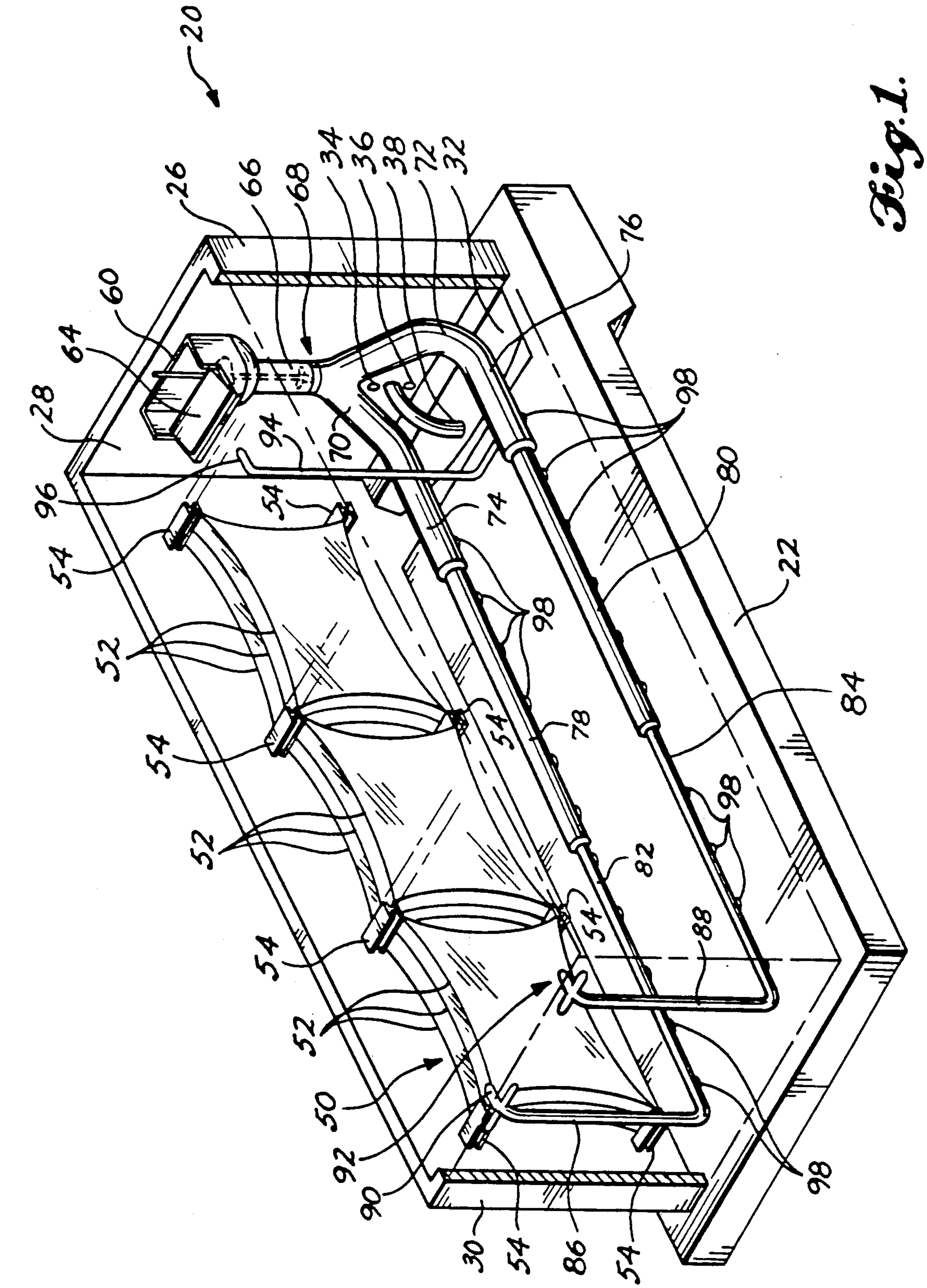
FIG. 1 is an isometric view of the anaerobic digester constructed in accordance with the present invention with portions of the wall and support media broken away.

Referring first to FIG. 1, the digester 20 is positioned on a suitable platform 22. In this embodiment, the digesting mass is contained by side walls 24 and 26 and end walls 28 and 30. The walls extend upwardly from the platform 22. In the drawings, the container roof has been omitted. It is to be understood, however, that a suitable conventional roof or lid is positioned over the container to maintain anaerobic conditions within the digester 20.

Figure 2:
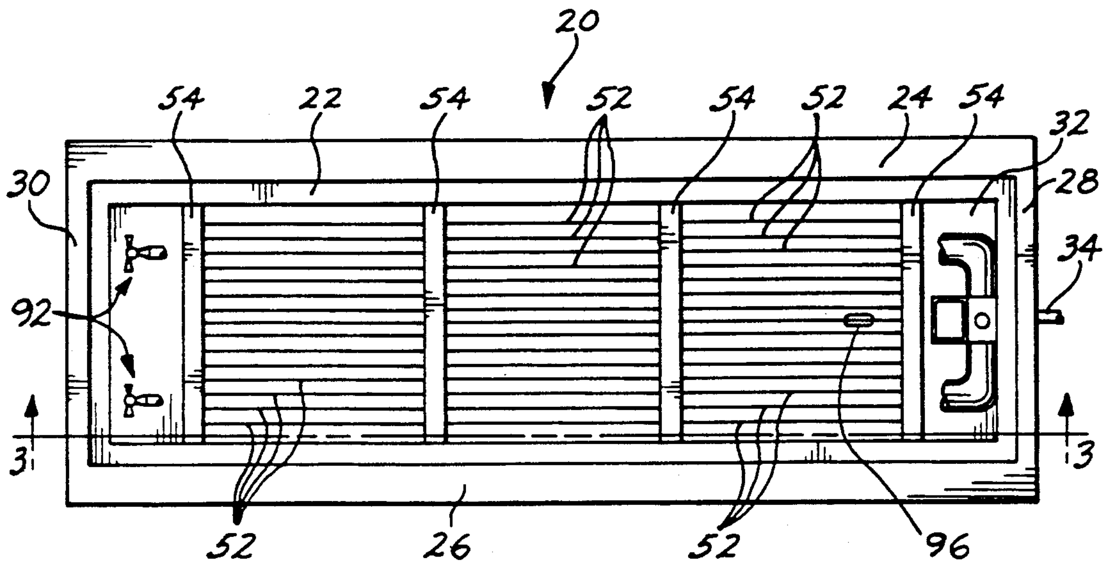
FIG. 2 is a top view of the digester.
Figure 3:
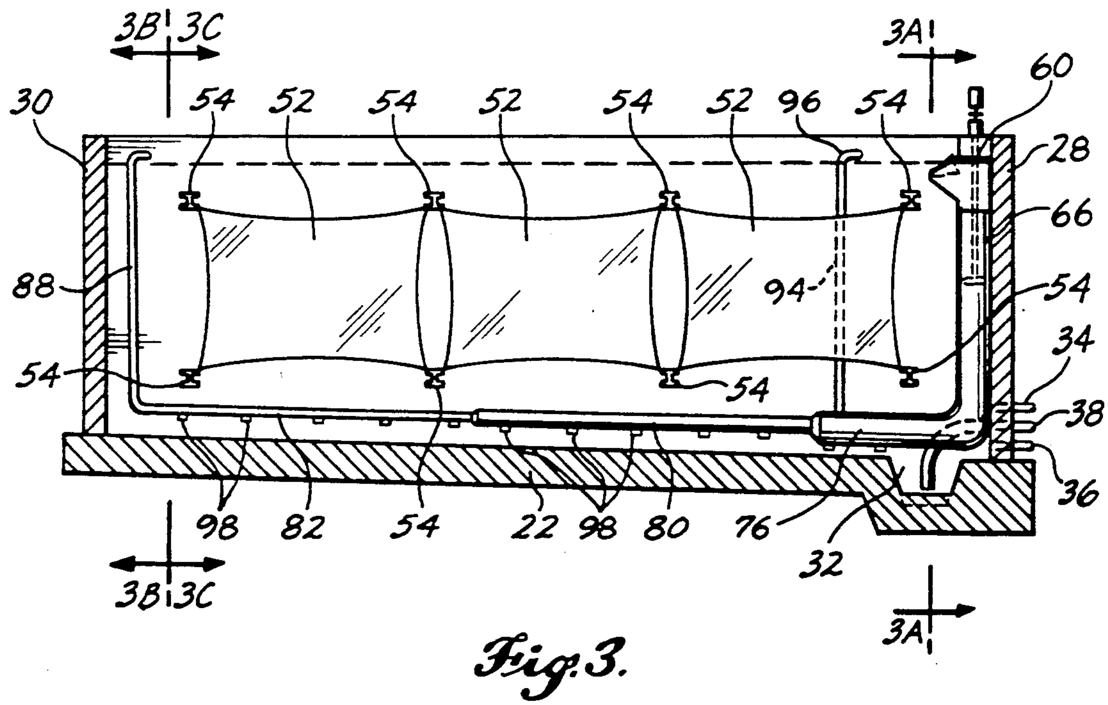
FIG. 3 is a longitudinal sectional view of the digester taken along section line 3—3 of FIG. 2.
Figure 5:
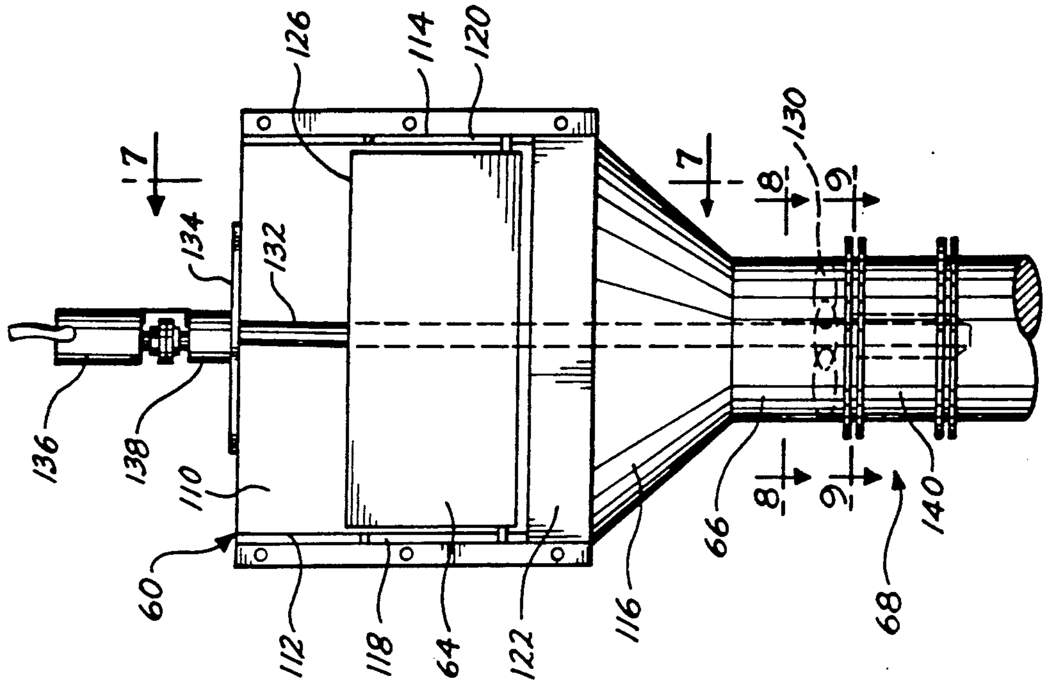
FIG. 5 is a front view of the floating weir and pumping system shown in FIG. 4.
Figure 4:
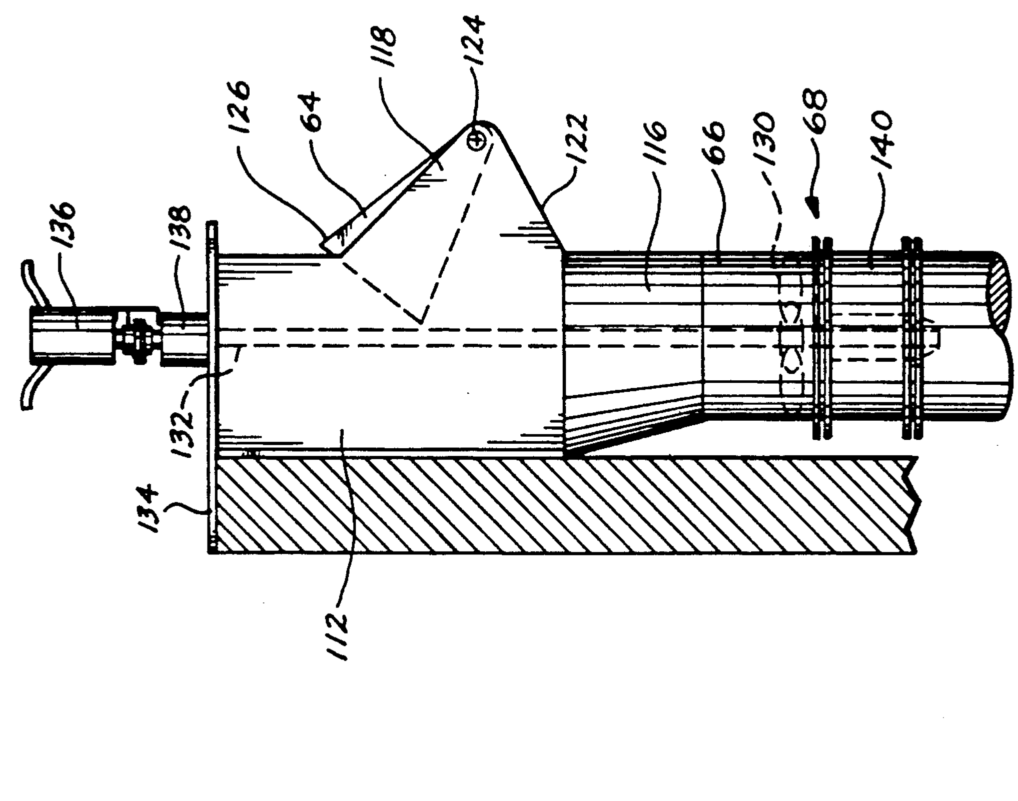
FIG. 4 is a side elevation view of the floating weir inlet for the liquid distribution system in the digester.
Figure 3A:
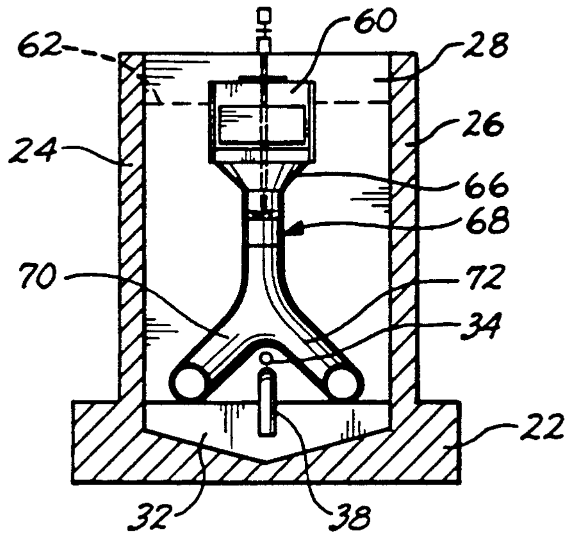
FIG. 3A is a cross-sectional view of the digester taken along a section line similar to 3A—3A of FIG. 3.
Figure 3B:
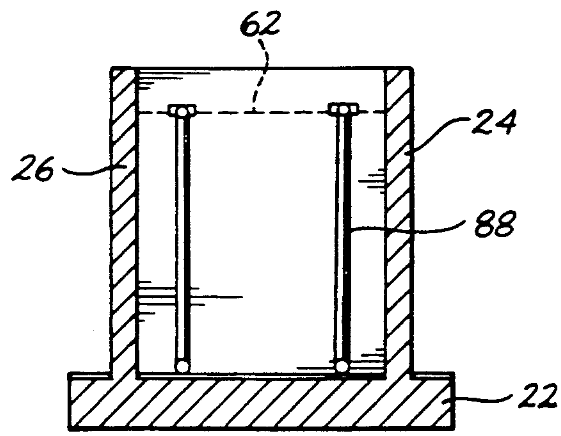
FIG. 3B is a sectional view taken along a section line similar to line 3B—3B of FIG. 3.
Figure 3C:
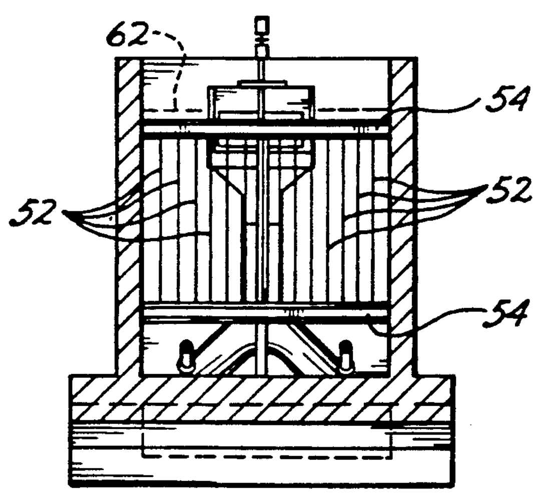
FIG. 3C is a cross-sectional view taken along a section line similar to 3C—3C of FIG. 3.
Figure 6:
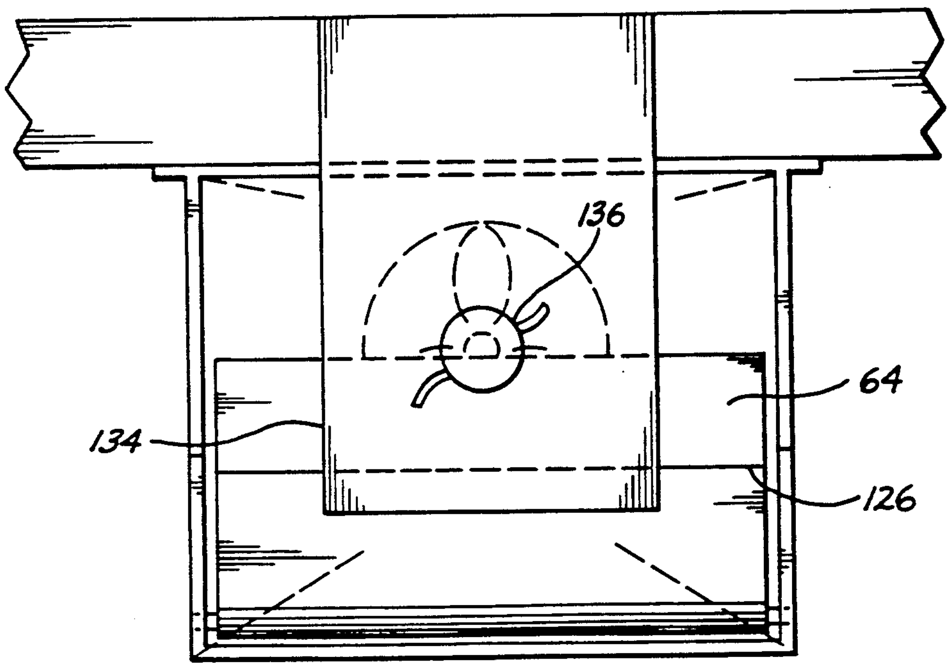
FIG. 6 is a top view of the floating weir and pumping system shown in FIGS. 4 and 5.
Figure 8:
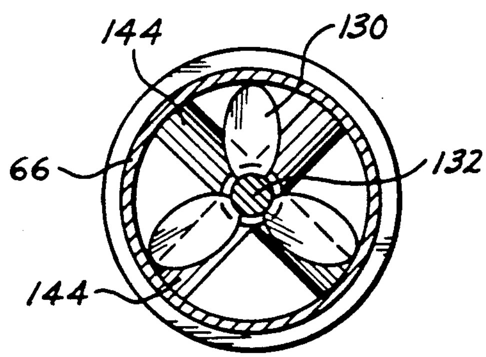
FIG. 8 is a cross-sectional view of the lower section of the pumping system taken along section line 8—8 of FIG. 5.
Figure 9:
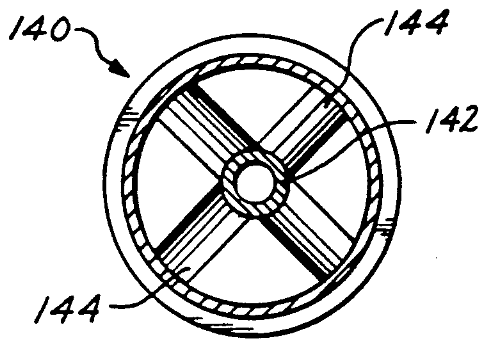
FIG. 9 is a cross-sectional view taken along section line 9—9 of FIG. 5 showing the stator flow straighteners.
Figure 7:
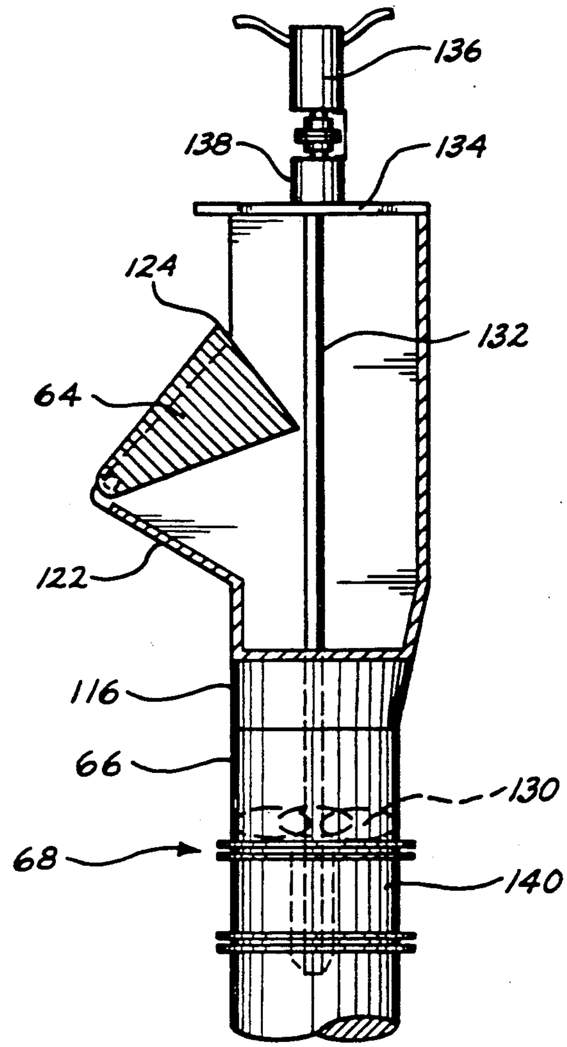
FIG. 7 is a longitudinal sectional view of the floating weir taken along section line 7—7 of FIG. 5.

Referring now to FIGS. 1, 2 and 3, a sump 32 is formed in the floor of the platform 22 adjacent one end wall 28. Aqueous organic feed stock slurry is injected into the digester through conduit 34 in the first end wall. Slurry is withdrawn through the conduit 36 positioned below conduit 34 adjacent the top surface of the platform 22. Grit or very heavy material injected into the digester through conduit 34 accumulates in the sump 32. The grit and heavy material in the sump 32 dan be withdrawn periodically after the digester is emptied through suction conduit 38. The lower end of conduit 38 is positioned adjacent the floor of the sump 32 and extends upwardly and outwardly through end wall 28.

The digester is supplied with support media on which microorganisms deposit and grow. It has been found that by supplying the digesting microorganisms with a substantial amount of surface area in the form of support media on which the microorganisms can deposit and across which a flow of digesting liquid can be maintained results in substantially increased efficiency in the digestion process. In a preferred embodiment of the invention, a plurality of sheets of support media are arranged in an upright orientation generally parallel to the side walls 24 and 26 of the digester. The sheets are arranged in spaced relationship transversely across the digester to provide a multitude of surfaces upon which microorganisms can deposit, grow and react.

A plurality of horizontal, transverse rails or I-beams serve as mounting supports for the support media 50. A first pair of rails 54 is situated in vertically spaced relationship adjacent the first end wall 28. The support rails extend between side walls 24 and 26 and are mounted to the side walls in a conventional manner. The upper support rail is situated adjacent the top of the container while the lower support rail 54 is located about one-fifth of the vertical height of the container above the floor of the container. A second pair of rails is situated adjacent end wall 30 while two additional pairs of rails are spaced equally between the end pairs of rails. The individual sheets 52 of support media are generally rectangular and are composed of a flexible, slightly elastic, plastic sheet material compatible with the microorganisms. A preferred material is food grade polyvinyl chloride sheet or film having a thickness of 20 mil. Also, very low density polyethylene may be employed. The sheets are suspended at the corners to leave no opportunity for the fibrous material and the sludge to ridge and block the spaces between the individual sheets. As will be explained in more detail below, the digesting slurry is caused to flow upwardly between the sheets. This fluid flow causes the sheets to move and wave. The waving motion dislodges minor sludge build ups and prevents large build ups of sludge and consequent plugging of the flow path for the biological nutrients.

Each of the individual sheets 52 contains a conventional peripheral hem through which a suitable cable is strung. Each of the sheets 52 then has a pair of vertically spaced horizontal cables and a pair of longitudinally spaced vertical cables. The ends of these cables are tied to adjacent pairs of rails 54 and are stretched so that they are taut. The rectangular dimensions of the sheet are slightly less than the distances between adjacent pairs of rails 54. Thus when the cables are attached to the rails 54 and stretched, each of the edges of the sheets forms a catenary. This construction allows the central portions of the sheets to wave and flex in the present fluid flow but provides relatively rigid edges especially on the lower side of the sheet so that the upwelling of fluid does not cause the sheets to bend toward each other and thus bridge the gap between adjacent sheets.

Referring now to FIGS. 1, 3, 3A, 3B, and 3C, the slurry circulation and distribution system will be described in more detail. The fluid inlet trough 60 is positioned adjacent the top of the fluid level 62 shown in dotted outline in FIGS. 3-3C. Fluid from the surface of the digesting mass passes over the edge of a floating weir 64 described in more detail below. The bottom of the inlet trough 60 is coupled to a vertical conduit 66 that houses the impeller generally designated 68. The impeller and flow straighteners will be described in more detail below. Below the impeller section, the conduit 66 branches into an inverted y-shaped branches 70 and 72, with each of the branches extending outwardly toward the side walls and toward the floor of the digester 20, all adjacent end wall 28. As the y-branches 70 and 72 approach the floor of the container, they are coupled by a suitable elbow to generally parallel conduits 74 and 76 extending towards the opposite end wall 30 in substantially parallel relationship. About one-fourth of the distance from the first end wall 28 to the opposite end wall, the conduits 74 and 76 are coupled to reduced diameter conduits 78 and 80 respectively, extending in parallel relationship toward end wall 30. Conduits 78 and 80 extend about halfway toward the end wall 30 from the ends of conduits 74 and 76 where they again are coupled to a second pair of reduced diameter portions 82 and 84.

The other ends of the conduits 82 and 84, adjacent end wall 30, are coupled to parallel risers 86 and 88 which extend upwardly from the ends of conduits 82 and 84 and terminate in nozzle assemblies 90 and 92 adjacent the surface 62 of the fluid. The nozzle assemblies 90 and 92 each have three outlets. The major outlet directs fluid longitudinally back across the surface of the container toward the inlet trough 60. The remaining two outlets are directed transversely to skim the surface of the fluid between the nozzle assemblies and outwardly toward the intersections of end wall 28 and side walls 24 and 26. Another rise 94 has its lower end connected to conduit 76. Riser 94 extends upwardly between support media sheets 52 and terminates in a nozzle 96 adjacent to the floating weir 64. Nozzle 96 is oriented to project fluid along the surface 62 toward the floating weir 64. The nozzle assemblies 90 and 92 as well as nozzle assembly 96 are employed to assure that the light phase of material that would otherwise collect on the top of the digesting mass is maintained in motion at all times to prevent it from becoming glued together by the bacterial action. In this manner, the surface of the digesting mass is always maintained as a flowing fluid. If desired, additional risers can be employed at intermediate locations to assure that the light phase at the top of the digesting mass is always maintained in motion. The additional risers can be coupled to conduits 78, 80, 82 and 84 at appropriate locations.

Distributed at spaced locations along the bottoms of conduits 74 through 78 are a plurality of nozzles 98. These nozzles project fluid from the conduit 74 through 84 in a downward direction toward the floor of the digester 20. In the preferred embodiment, also the upper surface of the platform 22 forming the floor of the digester has a slight slope to it extending downwardly from end wall 28 toward the sump 32. Grit that cannot be suspended in the fluid medium can be washed toward the sump and removed through the grit removal conduit 38. In this embodiment, the conduits 74–84 and thus the nozzles 98 are maintained at a substantially constant distance from the bottom of the digester so that the action of the fluid exiting from the nozzles 98 is substantially constant through out the entire bottom portion of the digester.

The fluid driven downwardly toward the floor impacts the floor and sweeps the surface of the floor in all directions. The fluid then turns upwardly and flows between the sheets 52 of support media 52, and between the outermost sheets and the side walls 24 and 26. In this way the heavy phase is prevented from accumulating on the floor of the digester and the digesting medium is always maintained in flowing relationship past the support media. In this manner nutrients in the digesting fluid are brought to the microorganisms on the support media, enhancing and continuing the digestion process.

Referring now to FIGS. 4 through 7, the inlet and impeller section of the liquid distribution system are shown in enlarged detail. The inlet trough 60 has a rear wall 110 and side walls 112 and 114. The rear wall and side walls are generally vertically oriented and terminate at their bottom ends in a reducer 116 that couples to the top portion of conduit 66. A pair of flanges 118 and 120 extend longitudinally outwardly from the lower portion of side walls 112 and 114. A bottom wall 122 extends from the forwardmost edge of flanges 118 and 120 downwardly and inwardly toward the upper end of reducer 116. The floating weir 64 has a generally equilateral triangular cross section with its apex pivotally mounted by a suitable pivot rod 124 to the outer ends of the flanges 118 and 120. The weir extends inwardly toward the interior of the inlet trough 60. The two sides of the equilateral triangle extend inwardly toward the interior of the inlet trough 60 and terminate in the base portion. When the base portion is in a generally vertically orientation, the base of the weir is positioned substantially in the middle of the inlet. The weir 64 extends substantially the entire distance between the side walls 112 to 114. Fluid flows over the upper edge 126 formed by the base of the weir and the upper surface of the weir. The sides of the weir are spaced slightly from the side walls 112 and 114 allowing some seepage of fluid between the weir and the side wall. Similarly, some seepage an occur between the apex of the weir and bottom wall 122. Fluid from the upper surface of the digesting mass passes over the upper edges 126 of the floating weir. The speed of the impeller is chosen such that fluid is distributed from the impeller section 68 at a sufficiently high rate so that a pool of liquid is always formed in the inlet below the bottom edge of the weir 64. In that manner, material always cascades over the top of the weir and falls into the pool, maintaining turbulent flow in the inlet to avoid clogging and to assure that the light phase and fibrous material in the light phase cannot agglomerate. Moreover, if any agglomeration has occurred, the action of the material falling over the weir into the turbulent pool will break up the agglomerations.

Figure 10:
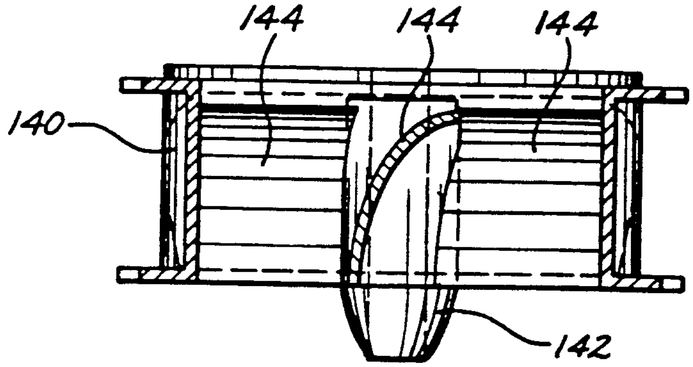
FIG. 10 is a longitudinal sectional view showing the flow straightener.

Referring now to FIGS. 4, 5, 6, 7, 8 and 9, a three-bladed impeller 130 is positioned at the bottom end of the vertical conduit 66. Impeller 130 is connected via a drive shaft 132, which extends upwardly through conduit 66 through the central portion of the inlet trough 60 and through a drive platform 134. A suitable hydraulic motor 136 is mounted on drive platform 134 and drives the shaft through a suitable coupling 138. Positioned in the impeller section 68 below conduit 66 is a flow straightener 140. The flow straightener 140, shown in more detail in FIGS. 8, 9 and 10, has a central bearing 142 in which the bottom end of the drive shaft 132 is mounted. The outer wall of the flow straightener 140 has a diameter substantially the same as conduit 66 and the upper portion of the y-conduit. The flow straightener is coupled to the conduits with suitable conventional flanges and fastening means (not shown). In this embodiment, the impeller 130, when viewed from the top, rotates in a clockwise direction driving the fluid downwardly. Extending between the bearing 142 and the outer wall of the straightener 140 are a plurality of straightening vanes 144. The straightening vanes extend from the upper end in a clockwise direction and downwardly to straighten the flow from a clockwise swirling within the conduit to a downward direction.

The present invention has been described in relation to a preferred embodiment. One of ordinary skill will be able to affect various changes, substitutions of equivalents and other alterations without departing from the broad concepts disclosed herein. For example, the inlet for the distribution system as well as the impeller section can be located outside the digester. When mounted outside, the weir and impeller are much more accessible for maintenance. The use of appropriate coupling conduits required to effect this alteration would be well within the ordinary skill. Accordingly, it is intended that the Letters Patent granted hereon be limited only by the definition contained in the appended claims and equivalents thereof.

The embodiments of the invention in which an exclusive property or privilege is claimed are defined as follows:

1. A digester for biologically altering a mass of fluid having solids therein comprising:

- a container having a first end and a second end;
- a plurality of panels arranged in said container, said panels being spaced from each other to allow liquid flow therebetween, said panels being oriented in a generally upright manner in said container;
- means for circulating liquid in said container, said circulating means having an inlet adjacent the first end of said container and a primary distribution conduit extending from said inlet to the bottom of said container adjacent said first end, and then extending along the bottom from adjacent the first end to adjacent the second end;
- pump means for drawing liquid in said inlet and circulating the liquid through said primary distribution conduit;
- a plurality of nozzle means coupled to said primary distribution conduit at spaced locations along the bottom of said container, said nozzles being oriented to spray liquid from said primary distribution conduit downwardly toward the bottom of said container, said liquid thereafter flowing upwardly between said panels and along the side walls of said container; and
- a secondary distribution conduit coupled to said primary distribution conduit adjacent said second end and extending upwardly therefrom; and
- a horizontal nozzle coupled to the upper end of said secondary distribution conduit for directing liquid back toward said inlet.

2. The digester of claim 1, wherein said mass of fluid has a surface, said horizontal nozzle being located adjacent the surface of said fluid in said container.

3. The digester of claim 1, wherein said panels are arranged in a generally parallel relationship.

4. The digester of claim 3, wherein said panels are arranged to run from said first end to said second end.

5. The digester of claim 3, wherein the upper and lower edges of said panels are attached to a catenary cable, said cable being anchored to cross members mounted in said digester.

6. The digester of claim 1, wherein said pump means is mounted in the portion of the primary distribution conduit between said inlet and the bottom of said digester.

7. The digester of claim 6, further comprising:

means for straightening fluid flow in said primary distribution conduit positioned in said primary distribution conduit downstream from said pump means.

8. The digester of claim 1, wherein the inlet comprises:

a fixed section having a fixed portion located above the liquid level in said digester and an inlet edge, said inlet edge forming the upper edge of a buoyant member, said buoyant member being mounted for vertical movement relative to said fixed portion, the buoyancy of aid buoyant member being chosen relative to the inlet flow rate created by said pump means such that liquid cascades over said inlet edge and drops downwardly into an inlet pool above the pump means so as to agitate said liquid and break up any agglomerations of solid material in said liquid.

9. The digester of claim 1, further comprising:

a second secondary distribution conduit coupled to said primary distribution conduit between said first and second ends and extending upwardly therefrom, and a nozzle coupled to the upper end of said second secondary distribution conduit for direction liquid toward said inlet, said nozzle being positioned adjacent the surface of said mass of fluid in said digester.

10. A digester for biologically altering a mass of fluid having solids therein and having a surface comprising:

a container;

support media positioned in said container for supporting microorganisms, said support media being oriented in a generally upright manner in said container;

means for circulating liquid in said container, said circulating means having an inlet located at a first location in said container and a primary distribution conduit extending from the inlet to the bottom of the container and then extending away from said first location, under said support media, to a second location spaced from said first location;

pump means for drawing liquid in said inlet and circulating the liquid through said primary distribution conduit;

a plurality of nozzle means coupled to the primary distribution conduit at spaced locations along the bottom of the container, the nozzle means being oriented to spray liquid from the primary distribution conduit downwardly toward the bottom of the container, the liquid thereafter flowing upwardly past the support media and along the sidewalls of the container; and a secondary distribution conduit coupled to said primary distribution conduit at a location spaced from said inlet and extending upwardly therefrom;

a horizontal nozzle coupled to the upper end of said secondary distribution conduit and spaced from said inlet for directing liquid back toward said inlet to maintain the surface of the digesting mass of fluid in motion.

11. The digester of claim 10, wherein said container has a first end and a second end, said first location being located adjacent said first end and said second location being located adjacent said second end.

* * * * *